United States Patent Office 3,439,528
Patented Apr. 22, 1969

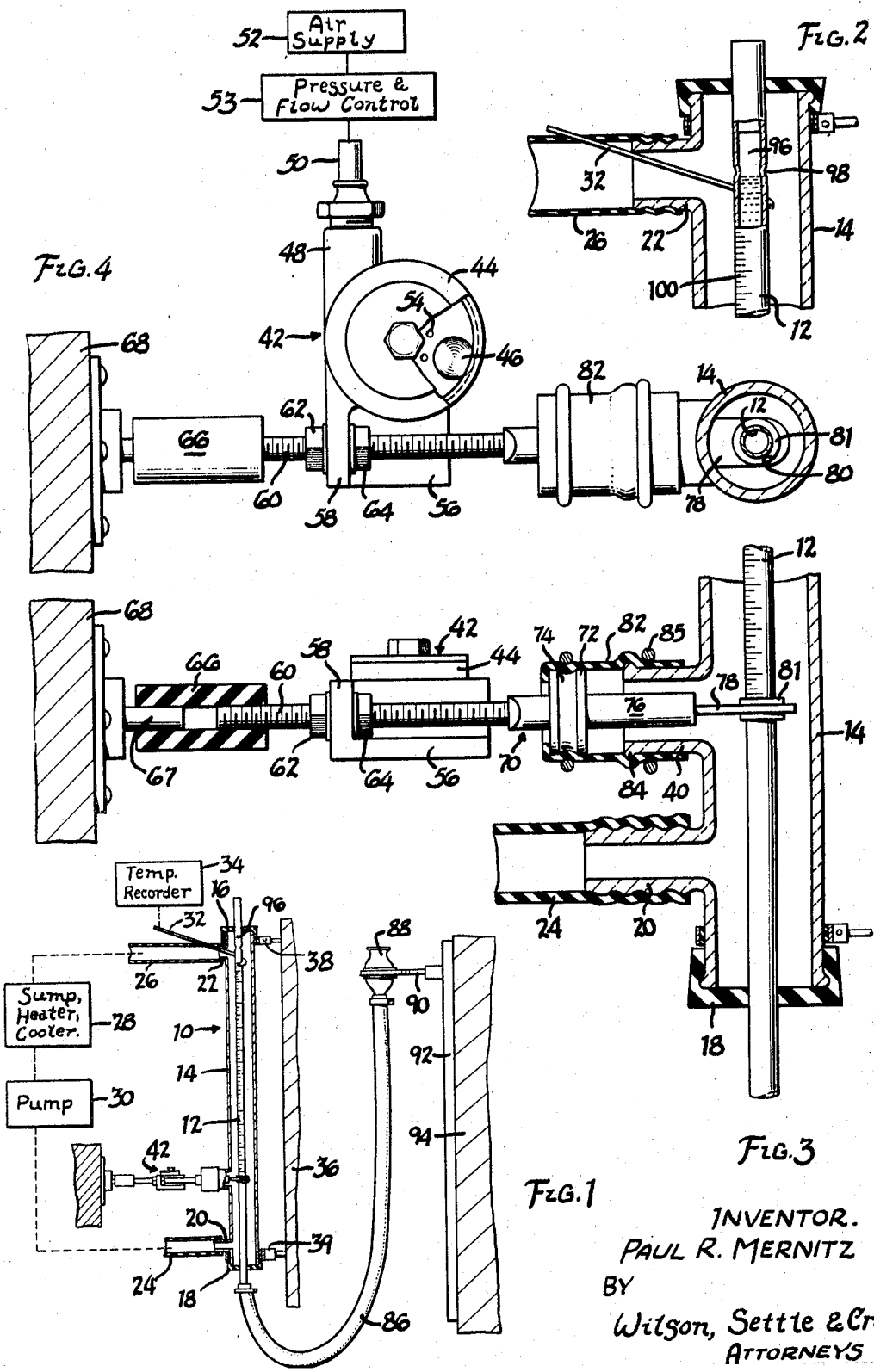

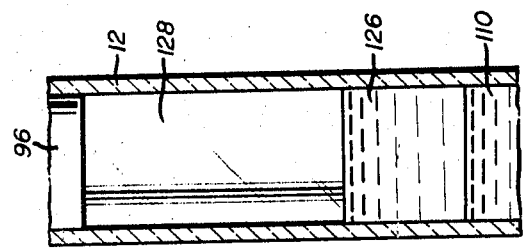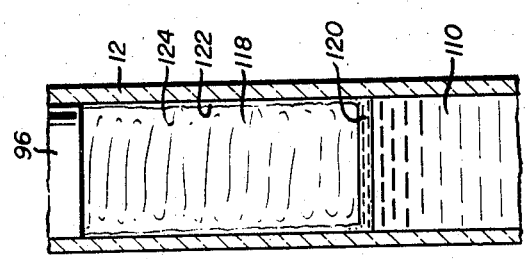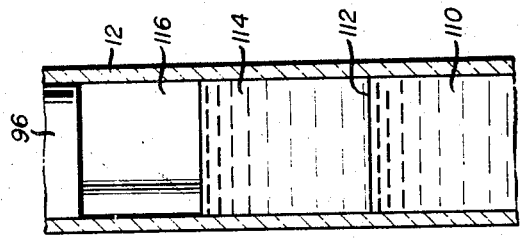

3,439,528
METHOD AND APPARATUS FOR AGITATING A TEST FLUID
Paul R. Mernitz, Alma, Mich., assignor to Leonard Refineries, Inc., Alma, Mich., a corporation of Michigan
Continuation-in-part of application Ser. No. 395,657, Sept. 11, 1964. This application Apr. 21, 1967, Ser. No. 659,243
Int. Cl. G01n 7/16
U.S. Cl. 73—53                 12 Claims

ABSTRACT OF THE DISCLOSURE

Apparatus is provided for vibrating a vertically oriented elongated transparent tube in a specific manner in order to agitate the contents of the tube. The apparatus is particularly suited for measuring the vapor/liquid ratio of a confined fluid.

A resilient plug fabricated of a self-sealing material seals an opening in the tube. A flexible tube has one end attached to the lower end of the transparent tube. The other end of the flexible tube receives a confining liquid which enters and fills the transparent tube. The other end of the flexible tube is adjustable to different vertical heights to permit varying the pressure of the confining liquid. A test fluid is injected into the upper end of the transparent tube by piercing the resilient plug. Means are provided for heating and vibrating the transparent tube to vaporize the test fluid. Readings are taken at different temperature levels to determine the vapor to liquid ratio of the test fluid. Vibration of the tube insures separation of the vapor and liquid portions of the test fluid to result in accurate readings.

*Reference to related applications*

This application is a continuation-in-part of my co-pending application Ser. No. 395,657, filed Sept. 11, 1964, now abandoned.

*Background of the invention*

There are many instances in which it is desired to measure the vapor/liquid ratio of fluid material. For example, in my copending application Ser. No. 395,908, filed Sept. 11, 1964, now Patent No. 3,316,168, I have disclosed a method for blending gasoline from different blending stocks to result in a gasoline product having predictable volatility characteristics. This method is based on the vapor/liquid ratio of the gasoline stocks at different temperatures.

One problem in accurately determining the vapor/liquid ratio is to maintain a constant state of equilibrium between the liquid and the vapor. I have solved this problem in accordance with the present invention by providing means for agitating a confined body of fluid to continuously create an equilibrium condition. My invention also contemplates an overall structure and method which incorporates the desired agitating structure.

It is therefore an object of this invention to provide a method and apparatus for accurately measuring the vapor/liquid ratio of a confined fluid.

Another object of the invention is to provide means for constantly agitating the confined fluid to maintain a condition of equilibrium between the vapor and liquid.

A further object of the invention is to provide a glass element for containing the fluid, the agitating means being capable of acting on the glass without breakage thereof.

A still further object of the invention is to provide a method and apparatus for measuring the vapor/liquid ratio of a fluid which is simple in operation and structure.

Other objects of this invention will appear in the following description and appended claims, reference being had to the accompanying drawing forming a part of this specification wherein like reference characters designate corresponding parts in the several views.

In the drawings:

FIGURE 1 is a side elevational view in section of one embodiment of the apparatus in accordance with the present invention;

FIGURE 2 is an enlarged sectional view in elevation of the upper portion of the buret structure shown in FIGURE 1;

FIGURE 3 is an enlarged sectional view in elevation of the agitating means of the FIGURE 1 apparatus;

FIGURE 4 is a top plan view of the agitating means illustrated in FIGURE 3;

FIGURE 5 is a view of the upper end of the buret before vibration and heating;

FIGURE 6 is a view of the upper end of the buret during vibration and heating; and FIGURE 7 is a view of the upper end of the buret after vibration and heating.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, it will be noted that the measuring apparatus 10 includes an elongated, vertically oriented glass buret 12 for confining the fluid to be tested. Glass is preferred. However, other transparent materials, such as plastic materials, may be used to fabricate the buret 12. The buret 12 is of relatively small diameter and is received within a large diameter elongated glass tube 14 which forms a jacket around the buret. Resilient caps 16, 18 are provided at each end of the tube 14 to retain the buret 12 in place and to seal the ends of the tube 14. Tube 14 functions to circulate a fluid heating medium around the buret 12 to permit control of the temperature of the contents of the buret 12.

It is necessary to the primary purpose of agitating a vertically oriented elongated buret that it be translucent or transparent for use as a buret, since visual measurement of the liquid to vapor interface position must be possible. The buret 12 material must also be capable of volumetric calibration for most of its length, such calibration remaining virtually unchanged by thermoplastic flow distortion under the influence of intermittent periods of heating to the vicinity of 250° F., by gravity or by concurrent application of the stressing force incident to its being placed into vibratory motion of the degree set forth later. Also the material of the buret must be negligibly chemically unaffected by solvation or reaction with such liquids as hydrocarbons, glycerine, water or their vapors heated intermittently to the vicinity of 250° F. Also its is required for the purposes of this invention that the dimensional stability referred to be maintained when there is applied to the buret a differential hydrostatic pressure of at least one pound per square inch under the same variation of temperature, since it is a condition of its usefulness that the operator may impose such a differential hydrostatic pressure if he desires.

The temperature control structure is best illustrated in FIGURE 1. As will be noted, an inlet 20 is provided at the lower end of the tube 14 and an outlet 22 is provided at the upper end. Flexible conduits 24, 26 extend from, respectively, the inlet 20 and outlet 22. A sump 28 including an adjustable heater unit and an adjustable cooling unit receives fluid from the outlet conduit 26. The fluid in the sump is heated or cooled to the desired temperature and is pumped into the inlet conduit 24 by means of a pump 30. In operation, fluid is constantly circulated through the tube 14 and varied through selected temperature ranges by adjustment of the heater or cooling unit. The temperature controlling fluid may be any convenient material such as water or high-flash white oil.

The temperature of the buret 12 is measured by means of a thermocouple. The measuring junction in the form of a lead 32 of the thermocouple extends through a liquid tight opening in the wall of the outlet conduit 22 and is wound around the upper end of the buret 12. The lead 32 extends to a potentiometer and recorder 34 suitably calibrated to directly indicate the temperature of the upper end of the buret 12. This temperature is equated to the temperature of the contents of the upper end of the buret.

The structure comprising the tube 14 and buret 12 is securely mounted to a support structure 36 by means of brackets 38, 39 located at the upper and lower ends.

The means for agitating the buret 12 are best illustrated in FIGURES 3 and 4. An opening fitting 40 is provided in the tube 14 just above the inlet 20. The opening 40 is provided for insertion of a portion of the vibrator mechanism into the tube 14 to contact the buret 12. The vibrator mechanism includes a vibrator 42 which comprises a cylindrical housing 44. The housing 44 encloses a metal ball 46. A circular track is provided within the housing for the ball 46. The housing 44 has an inlet 48 directed tangentially to the ball track. A flexible conduit 50 leads from the inlet 48 to an air supply 52. An adjustable pressure and flow mechanism control 53 is provided to permit control of the intensity and frequency of the vibrations. The mechanism 53 may take the form of a separate manually adjustable pressure limiting device for controlling the maximum intensity of vibration and a throttling valve for rapid adjustments during operation. Openings 54 are provided in one wall of the housing 44 for the escape of air. In operation, when air under pressure is injected through the inlet 48, the ball travels around the track. Travel of the ball around the track results in a continuously changing balance of the housing 44 resulting in a reciprocatory vibratory movement thereof.

An L-shaped bracket 56 extends from the housing 48. One flange 58 of the bracket 56 receives a threaded element 60, the bracket 56 being secured to the element 60 by means of nuts 62, 64. One end of the element 60 is received in a resilient thick-walled sleeve 66. The other end of sleeve 66 is mounted on a stud 67 which is secured to a support structure 68. The other end of the threaded element 60 carries a fixture 70. The threaded element 60 and fixture 70 are preferably fabricated from a corrosion resistant metal.

The fixture 70 has a cylindrical element 72 which is provided with a peripheral groove 74. Extending from the element 72 is a portion 76 which projects into the fitting 40. The portion 76 carries, on its inner end, a flat projecting member 78. The member 78 extends into the tube 14 and has an opening 80 to receive the buret 12. A grommet 81, fabricated from, for example, Teflon, is provided in the opening 80 to snuggly receive the buret 12.

The connection between the fixture 70 and tube 14 is made fluid tight by means of a resilient sleeve 82. One end of the sleeve 82 is received on the fitting 40 and the other end is received on the cylindrical element 72. The groove 74 and O-ring 75 on the element 72 insures a fluid tight seal. A bead 84 and O-ring 85 is provided on the inlet fitting 40 to seal the opening.

In operation, when the vibrator 42 is actuated, the vibrations are transmitted through the threaded element 60 to the buret 12 via the fixture 70. The vibration is, of course, not violent but only sufficient to cause the desired agitation of the contents of the buret 12. The intensity of vibration is adjusted by means of the control 53 to a point below that which would cause fracture of the buret 12.

The particular mode of agitation, by vibratory displacement of elements of the tubular buret member, leads to various fundamental requirements of the material and configuration thereof.

In its preferred embodiment, a transparent, calibrated member 12 is supported in the enclosing media jacket 14 by a resilient membrane 18 at its bottom end. Since this bottom membrane must support the weight of the circulating heating medium and confine it without leakage at its junctions with member 12 and jacket member 14 respectively, it will substantially damp out vibratory transverse motion and become an imposed node under all conditions of vibratory frequency. The other restraining membrane 16 at the upper end of the vibrating buret member 12 may, on the other hand, be of extremely thin and resilient construction since it is not required to withstand hydrostatic force and only prevents spillage of the circulating media. This membrane 16 is thus not needed to damp vibration substantially, and a vibratory node does not necessarily result in member 12 at its juncture with 16 under all conditions of vibratory frequency.

The members 18 and 16 exert their restraint on vibrating member 12 in an orthogonal direction only; there is no necessary longitudinal component of restraint which would subject member 12 to any imposed tension or compression.

The buret member 12 is an elastic structure. As in any elastic structure, a single momentary transverse displacement of its static position will cause elastic forces to set up a restoring force proportioned to its displacement as long as the elastic limits of the structure 12 are not exceeded. Such a single impulse would set up free vibration, damped by the restrain at the juncture with lower restraining membrane 18, and to a lesser extent at the juncture with upper restraining membrane 16. The frequency of such free vibration will depend upon the mass of the vibrating member, its length and diameter, and its modulus of elasticity. If now a repeated forced displacement of definited frequency is imposed on the vibrating member 12, that member will seek to vibrate harmonically in the fundamental or one of the higher harmonics, depending upon the phase-matching of the frequency of the forced displacement. When perfectly in phase, sympathetic vibration will tend to increase the amplitude of the displacement of elements of member 12 in resonance. Also at such times of resonance, definite nodes of no displacement will appear at various distances along the length of vibrating buret 12 and standing-wave loops will appear, of relatively large and increasing amplitude at the antinodal points, which by exceeding the elastic limit of the vibrating buret may cause it to break.

The present invention is devised to discourage the formation of stable standing waves and the resultant destructive resonating vibratory system. In practice a very complex non-resonating pattern of vibration is established for two reasons: first, to avoid the appearance of destructive reasonating waves, and second to provide that the nodes and anti-nodes change in position very rapidly so that no node persists longer than a few milliseconds except at the point of firmest support, namely the lower supporting membrane 18. Since the object of vibration is to provide for essentially equal stirring of the test liquid and its vapors at any point along the calibrated portion of the buret length, it serves the purpose to operate in the complex, non-resonating mode.

This purpose has been accomplished in this invention in the following way. First, the effective mass and elasticity characteristics of the buret is in practice continually changing as the temperature of the surrounding heating medium changes. Slight temperature-dependent density and modulus of elasticity changes are continually occurring in the tubular member 12, but more importantly the enclosed liquids and vapors generated from them in the buret are constantly changing in density. The largest change is due to the changing portion of the buret occupied by generated vapors which causes a shift in its center of gravity. This has an effect, at a constant forced-frequency input, of continually putting the natural resonant frequencies of the whole buret and enclosed liquids out of phase, helping to avoid destructive and unwanted resonance.

Second, the device selected for applying forced vibration, namely the vibrator 42, has been chosen because it is quickly regulatable to a stepless succession of frequencies between about 20 cycles per second up to about 335 cycles per second, by gradual increase of the air supplied by the throttling valve. Since it has no single mechanically induced frequency, and in conjunction with the continually changing natural frequency of the vibrating member and its liquid content already referred to, the vibrator chosen makes it easy to avoid destructive resonant frequencies.

Thirdly, the device 42 described for applying forced frequency has been selected so that its centrifugal force, as unbalancing ball 46 is driven in its track is transmitted with minimal damping to the buret member 12. Its size (and effective force) is chosen such that the amplitude of displacement from the rest position, when attached through linkage 76 to buret member 12 does not deflect the member 12 beyond its breaking point anywhere along the length of the latter. It will be appreciated from mechanical kinetics that the centrifugal inertial force transmitted through this linkage varies positively with the square of the velocity of the ball 46 in its ball race. Furthermore, the linkage 78 has been attached to buret member 12 at a point relatively near the only effective point of nodal support, namely its restraint in lower membrane 18. When now a displacement is induced by thrust through this linkage, there results a lever-arm effect on the deflection of buret 12. Since the majority of the buret and contents' mass is concentrated above linkage 78, its inertia is too great to allow free lever-arm motion when the direction of the thrust is changed or reversed (whether circular or reciprocatory) at greater than 20 cycles per second. There will thus be at some points along member 12 instantaneous linear displacement of up to ten times of the amplitude of displacement at the point of linkage itself. As already explained, the force transmitted at low velocities of the ball 46 will be well constrained by the combination of stiffness and inertia of buret member 12, so that the amplitude of deflection will be very low. Now as the velocity of ball 46 is increased, the force transmitted by linkage 76 and the amplitude of the translatory motion at the point of linkage will be greater.

The vibratory device used generates up to fifty pounds of centrifugal force when steplessly controlled up to 350 cycles per second. The acceleration imparted at the vibrator to buret linkage varies smoothly from about 38 $g$'s to about 125 $g$'s. The practicable limit of acceleration as supplied by the vibrator is 150 $g$'s, although well-annealed and unscratched glass buret members 12 have been found able to withstand even higher accelerations. The bushing 81 also diminishes somewhat the actual acceleration at the linkage 70, by damping.

The amplitude of motion imparted at the linkage point is relatively invariant, varying only between 0.19 and 0.26 mm. as the force and resulting acceleration is steplessly increased.

Formulas governing these values are as follows:
Accelerative force: $F = aw^2/32.2$ where:

$F$ = numerical value of acceleration expressed in $g$'s, i.e., in multiples of the acceleration due to gravity.
$a$ = amplitude of motion in feet
$w = 2\pi$ times the number of cycles per second vibration
$32.2$ = ft./sec.$^2$, the acceleration due to gravity The amplitude of displacement (assuming no physical restraint on the vibrator body):

$$X = \frac{FG}{W(2\pi f)^2}$$

where:

$X$ = amplitude in inches
$F$ = centrifugal force
$W$ = weight of object vibrated in pounds
$G = 386$
$f$ = cycles per second (revolutions per second of rolling ball)

However, the vibrating member 12 will be thrown into a vibration characterized by rapidly changing patterns of higher harmonics of transverse waves, transitory nodes and antinodes. The displacement from rest of buret 12 will at no point exceed that which would cause the material of buret 12 to fracture or exceed its elastic limit.

The vibration inducing device 42 described herein is one in which the thrust applied to the vibrating member is rotary, when the two members 42 and 12 are oriented as shown in FIGURES 3 and 4. Support sleeve 66; resilient sleeve 82 and the grommet for opening 80 of the linkage do not restrain any component of this circular thrust beyond a slight damping effect. It would be possible to extend that portion of the threaded linkage which is smooth, such as at 70, pass it through a fixed, well lubricated bushing and thereby constrain the vibrational impulse to only its longitudinal components. In such a case, buret 12 would receive reciprocatory thrust at linkage 78. It has been found that either mode of applying vibration is satisfactory. It is not, however, been found satisfactory in the present invention to orient vibrator 42 so that the ball race is essentially parallel with buret tube 42. It is necessary that the amplitude and frequency of transverse vibration prevail at all measuring (calibrated) parts of the tube used as a buret. This has been realized by the device of avoiding resonant frequencies with a frequency-stepless vibrator and because the buret 12 is constantly changing in mass and center of gravity from temperature and density effects so that it maintains no definite fundamental frequency and harmonies. The vibrational wave pattern is uneven, but everywhere exceeding .2 mm. amplitude (although it may attain amplitudes of as great as four mm. without changing the resultant dispersion of the test liquid in its vapor.)

It is also necessary that the acceleration orthogonal to the tube axis imparted by the vibrator, at its linkage with member 12, shall not be so great as to break the glass, since this material will exhibit perfect elasticity so long as its breaking stress is not exceeded. Therefore this design has avoided vibration driver frequencies above about 335 cycles per second in order to preserve the necessary amplitude of displacement and yet remain safely below values of acceleration which would constitute breaking stresses.

Consideration of Young's Modulus for bending of a cylindrical bar:

$$M = \frac{4mgl^3}{3r^4s}$$

where:

$m$ = the mass of the bar
$g$ = acceleration due to gravity
$l$ = length between support and application of force
$r$ = radius
$s$ = amplitude of flexure shows that maximized length and minimized radius of the member favors an ample factor of safety in obtaining the relatively great amplitude or flexure of the member. The optimum ratio of length to radius has been found to be about 200 and the apparatus works well at a ratio (for glass) of 150, with perhaps a slightly greater likelihood of breakage from momentary resonance. The ratio may be increased to any practicable level consistent with the requirements of sample measurement and introduction.

The means for filling the buret 12 with the desired fluid are best illustrated in FIGURES 1 and 2. A flexible tube 86 is connected to the lower end of the buret 12. The tube 86 is then directed upwardly and has a receptacle 88 on the upper end thereof. The interior of the receptacle 88 is open to atmospheric pressure. The receptacle 88 is mounted in a bracket 90 with is adjustably secured in a vertical track 92 carried on support structure 94.

The upper end of the buret 12 is sealed by means of a resilient plug 96. As will be noted in FIGURE 2, the plug 96 is inserted into the upper end of the buret and contacts a peripheral indentation 98 to result in a fluid tight seal. The plug is fabricated from a self-sealing material such as silicon rubber. The self-sealing feature referred to is the ability of the material to reseal itself after being punctured with a needle.

In use of the apparatus 10, the buret 12 is first filled with a confining liquid. The function of the confining liquid is to seal the lower end of the buret, to be displaceable under the influence of the test fluid and to provide means for controlling the pressure on the test fluid. The confining liquid is selected with reference to the material to be tested. The confining liquid must have a substantially higher viscosity than the test material and be substantially non-volatile in the temperature range of interest. The confining liquid must not be readily miscible with the test fluid and must be heavier than the test fluid so that it will remain beneath the test fluid. Glycerine is a suitable liquid for use in connection with measuring the vapor/liquid ratio of gasoline blending stocks.

When filling the buret 12, the plug 96 is first inserted into the upper end of the buret. An air escape is provided in the plug. The air escape may take the form of a hollow needle which is inserted through the plug into the buret. The tube 86 is then filled with the confining liquid by pouring this liquid into the receptacle 88. Substantially all of the air must be removed from the buret 12. This may be accomplished by providing a suction at the hollow needle or an above atmosphere pressure on the confining liquid in the receptacle 88. The receptacle 88 is located so that the level of liquid therein is substantially at or above the lower surface of the plug 96.

After the buret has been filled with the confining liquid, the hollow needle is removed from the plug 96 and a known volume of the fluid to be measured is injected into the buret in liquid form by means of a syringe having a needle which is inserted through the plug 96. The end of the needle should be below the interface of the confining liquid and the lower surface of the plug 96. The injected liquid should be at a temperature below that at which significant amounts would volatize during handling. It has been found that a suitable injection temperature for gasoline and most of its blending stocks is 32° F.

The pressure head of the confining liquid against the test fluid is adjusted during operation of the apparatus to assure that the testing will always be under standardized pressure conditions. The pressure head of the confining liquid is adjusted by raising or lowering the receptacle 88 relative to the buret 12. The pressure on the test fluid should be adjusted with respect to the elevation above or below sea level and the current barometric variation from standard pressure conditions. Additionally, the pressure conditions may be varied to accord with expected pressure conditions encountered in the end use of the test fluid.

Readings are taken in stepwise fashion. As portions of the test fluid vaporize, the confining fluid is displaced, resulting in a change in the pressure head of the confining fluid. This variation is anticipated and compensated for by initially adjusting the position of the receptacle 88 so that the pressure head at the point of measurement will be correct.

The temperature of the buret is then controlled by means of the heating fluid passing through the tube 14. A controlled rate of temperature rise is provided by suitable adjustment of the heater. As will be appreciated, as the tempertaure rises, portions of the material being tested go from the liquid to the vapor stage. A scale 100 is provided on the buret to permit measurement of the volume of vapor at any point in the testing operation. This scale is preferably painted on rather than etched. Etching would create weak points in the buret which would tend to cause fracture thereof when the buret is vibrated.

Temperature readings are taken at successive preselected vapor volumes. The vibrator 42 is turned off momentarily when each reading is taken and then turned on immediately after the reading is ascertained to thereby continue to maintain a condition of equilibrium between the vapor and liquid.

FIGURES 5, 6 and 7 illustrate the condition of the buret 12 and contents before, during, and after heating and vibration. In FIGURE 5, the confining liquid 110 is at a level 112. The test fluid, for example, a gasoline blending stock, has a liquid phase 114 and a vapor phase occupying the space 116 (this assumes that a portion of the test fluid has already been vaporized).

The buret 12 is then vibrated and heated as shown in FIGURE 6. As will be noted, the liquid phase of the test fluid is substantially dispersed in the space 118 formed by the vaporized phase, leaving only a small layer of liquid 120 resting on the confining liquid 110. It will be noted that none of the confining liquid has been dispersed in the vapor space. The vibration must be of sufficient amplitude to cause agitation to maximize the total area of the test liquid exposed to its own vapors while still not dispersing the confining liquid.

Ring layers 122 and a rough peripheral portion 124 are visually discernible during the vibration. These are believed to be the liquid phase which tends to move upwardly. The liquid is believed to be moved up by the vertical component of longitudinal wave fronts which constantly form and dissipate.

After the desired temperature has been reached, vibration is stopped.

As shown in FIGURE 7, the liquid phase of the test fluid drops, forming a layer 126 which is smaller than previous layer 114 because more of the liquid has been vaporized. The vapor space 128 is, of course, larger than before.

It is necessary to the vapor/liquid equilibrium purpose of this invention that there be a marked difference in viscosity between the liquid used for confining the measured liquid and the measured liquid itself, the confining liquid being the more viscous. This is true because the degree of agitation chosen must not substantially cause intermixture or emulsification of the two liquids. It has been found that given the amplitude of displacement possible to obtain with the system of agitation detailed above, the glycerine as described in the preferred embodiment serves well. It allows substantially complete dispersion of the test liquid as droplets in its own vapor, without similar dispersion of the glycerine. It will be understood that any similarly viscous liquid, non-miscible with the hydrocarbon under test, will exhibit the necessary properties.

It is basic to this invention that the amplitude of the transverse vibration, when the member 12 is set into motion, shall be at least great enough to make the test liquid disperse above its natural level due to gravity, break into droplets and present the maximum surface/ volume ratio for easy exchange of heat, while at the same time the viscous confining liquid, e.g. glycerine, does not tend to disperse within and mix with the gasoline liquid. It is found that within the limits of viscosity and temperature of interest, a transverse amplitude of at least .2 millimeter, at frequencies between 20 and 400 cycles per second satisfies this condition.

After testing the fluid under conditions of rising temperature, the process may be reversed by means of cooling the test fluid by use of the cooling device in the sump 28, readings being taken during the cooling cycle. Such readings assure accuracy of the test results.

It is not possible to set forth an exact formula for selecting the particular components to fabricate an apparatus in accordance with the invention. However, criteria as set forth in the preceding description is sufficient to facilitate the proper selection of components for a particular apparatus. As an example of one suitable structure, a glass buret seventy-five centimeters in length was used. The buret had an I.D. of .5 centimeter and an O.D. of .7 centimeter. The vibrator was attached eight centimeters from the bottom. The vibrator, unrestrained, had a range of from 20–335 cycles per second and an amplitude of vibration of from .19 to .25 millimeter. The best range of vibration was found to be from 216.7 to 350 cycles per second.

Various features of the invention may be appreciated at this point. Sealing of the upper end of the buret with the self-sealing plug 96 obviates the need for a mechanical clamp-seal. Such clamp-seals are subject to leakage. The vibrating mechanism of the present invention results in modulated turbulence ranging from very mild to very vigorous agitation throughout the usable length of the buret. This is true no matter where the interface of interest is. The modulation is precise and very rapid. This permits quick stops and starts for the intermittent readings to be taken. The modulation results in liquid to vapor equilibrium of the material under test without seriously involving the more viscous glycerine confining liquid.

The turbulence is beneficial, in addition to creating a situation of equilibrium, in that it maximizes the heat transfer through the glass buret walls by establishing turbulent contact of the heating media external of the buret. This permits accurate temperature control. Agitating by means of vibration eliminates the need for mechanical stirrer parts. This is advantageous in that full visibility is provided in the buret because there are no submerged stirrer parts, there is no need to move the stirrer parts as the interface of interest changes, and it is not necessary to correct the buret readings to compensate for the change in displacement of fluid caused by movement of the stirrer parts. Vibratory agitation is also advantageous in that it takes advantage of the nearly perfect elasticity of glass and permits the use of a long, narrow buret capable of precise volume calibration. Vibrators other than the air driven vibrator illustrated can, of course, be used.

The portion of the apparatus including the means for agitating an elongated glass tube may also be used in connection with a laboratory distillation column. In such an application little or no packing would be required to obtain turbulent liquid-to-vapor contact throughout the length of the column. This results in a minimum amount of holdup and pressure drop. The agitating structure and elongated glass tube may also be used as a continuously operated gas or liquid scrubber. In such a scrubber, the gaseous phase may move concurrently or countercurrently with a liquid phase to exchange heat or to effect a solubility equilibrium under controlled temperature. The agitating structure may also be used as a cleaning device for pipettes, burets and the like in which a jet of cleaning fluid is made to thoroughly rinse internal parts of the vibrating object.

Having thus described my invention, I claim:

1. Apparatus for measuring the vapor/liquid ratio of a confined test fluid comprising a vertically oriented elongated transparent tube, spaced apart mounting means securing the tube in place, sealing means at the upper and lower ends of the tube, means for injecting a test fluid into the tube, vibrating means operatively connected to the tube intermediate the mounting means for agitation of the tube and its contents, a jacket surrounding the tube, and means for circulating a temperature control medium through the jacket to control the temperature of the tube and its contents.

2. Apparatus as claimed in claim 1 and further characterized in the provision of means for selectively varying the temperature of the temperature control medium to thereby selectively vary the temperature of the tube and its contents.

3. A method of measuring the vapor/liquid ratio of a test fluid including the steps of providing a vertically oriented transparent tube, sealing the upper end of the tube with a plug fabricated of a self-sealing material, piercing the plug with a hollow element to provide an air bleed, filling the tube from the lower portion thereof with a confining liquid, removing the air bleed element, piercing the resilient plug with a second hollow element, injecting a known amount of a test fluid into the upper end of the tube through the second hollow element, removing the second hollow element, agitating the tube and its contents to create a condition of equilibrium between the liquid and vapor portion of the test fluid, and then discontinuing agitation and immediately measuring the volume of vapor within the tube and the temperature of the test fluid.

4. A method of measuring the vapor/liquid ratio of a test fluid including the steps of confining a known amount of the test fluid in liquid form in a transparent tube, (1) heating the liquid to an elevated temperature to cause a portion of the liquid to pass to the vapor stage, (2) agitating the tube and its contents to create a condition of equilibrium between the liquid and vapor portion of the test fluid, (3) discontinuing agitation of the test fluid and immediately thereafter measuring the volume of vapor within the tube and the temperature of the test fluid, heating the liquid to successively higher temperatures, and repeating steps (2) and (3) at the successively higher temperatures of the test fluid.

5. The method of claim 4 and further characterized in the steps, after completing the method at successively higher temperatures, of cooling the test fluid to cause portions of the vapor to pass to the liquid stage, and repeating steps (2) and (3) of claim 4 at successively lower temperatures of the test fluid.

6. Apparatus for measuring the vapor/liquid ratio of a confined test fluid comprising a vertically oriented elongated transparent tube, at least one mounting member securing the tube in place, means for filling the tube with a confining liquid which is more viscous than the test fluid, means for injecting a test fluid into the upper portion of the tube, and vibrating means operatively connected to the tube intermediate its ends and spaced from the mounting member for vibrating the tube.

7. Apparatus as claimed in claim 6 and further characterized in that said vibrating means is operative to cause substantially all of any liquid phase of the test fluid to be dispersed in the vapor phase, if any, of the test fluid during vibration.

8. Apparatus for measuring the vapor/liquid ratio of a confined test fluid comprising a vertically oriented elongated transparent tube, means for sealing and supporting the test fluid within said tube, mounting means supporting said tube adjacent the lower end thereof and susbtantially damping transverse vibratory motion of said tube, and vibrating means operatively connected to said tube above and adjacent said mounting means and intermediate the ends of said tube for agitating said test fluid to cause said fluid to disperse above its gravitational level.

9. Apparatus as defined in claim 8 in which said means for sealing and supporting the test fluid comprising a confining fluid having a density and viscosity greater than the density and viscosity of said test fluid and sealing means in the upper end of said tube.

10. Apparatus as defined in claim 8, further including means for controlling the temperature of said tube and contents of said tube.

11. Apparatus as defined in claim 10, in which said last means comprises a transparent jacket surrounding said tube and means for circulating a temperature control medium through said jacket.

12. Apparatus for measuring the vapor/liquid ratio of a confined test fluid comprising a vertically oriented elongated transparent tube, spaced apart mounting means securing the tube in place, a resilient plug fabricated of a self-sealing material sealing the upper end of the tube, means for filling the tube with a confining liquid having a density greater than the density of said test fluid, said plug being pierceable for injection of a test fluid into the tube above said confining liquid, and vibrating means operatively connected to the tube intermediate the mounting means for agitation of the tube and its contents to disperse said test fluid while maintaining a separation between the test fluid and the confining fluid.

References Cited

UNITED STATES PATENTS

| | | | |
|---|---|---|---|
| 2,537,668 | 1/1951 | Hebard | 73—38 |
| 2,550,701 | 5/1951 | Lardy. | |
| 2,839,152 | 6/1958 | Tracht. | |
| 2,966,055 | 12/1960 | Tracht et al. | 73—53 XR |
| 3,218,851 | 11/1965 | Sipin. | |

LOUIS R. PRINCE, *Primary Examiner.*

J. W. ROSKOS, *Assistant Examiner.*

U.S. Cl. X.R.

73—19, 61